(12) United States Patent
Sasaki

(10) Patent No.: US 7,030,927 B2
(45) Date of Patent: Apr. 18, 2006

(54) APPARATUS FOR DETECTING FOCUSING STATUS OF TAKING LENS

(75) Inventor: Tadashi Sasaki, Saitama (JP)

(73) Assignee: Fujinon Corporation, Saitama (JP)

( * ) Notice: Subject to any disclaimer, the term of this patent is extended or adjusted under 35 U.S.C. 154(b) by 592 days.

(21) Appl. No.: 10/090,756

(22) Filed: Mar. 6, 2002

(65) Prior Publication Data

US 2002/0140841 A1    Oct. 3, 2002

(30) Foreign Application Priority Data

Mar. 28, 2001   (JP)   ............... 2001-093366

(51) Int. Cl.
*H04N 5/232* (2006.01)
*G03B 13/00* (2006.01)

(52) U.S. Cl. ................................. 348/345
(58) Field of Classification Search ............... 348/302, 348/307–310, 311; 250/250, 204
See application file for complete search history.

(56) References Cited

U.S. PATENT DOCUMENTS

| | | | |
|---|---|---|---|
| 4,314,151 A | | 2/1982 | Suzuki et al. |
| 4,333,716 A | | 6/1982 | Sakane et al. |
| 4,414,575 A | * | 11/1983 | Yamamoto et al. .......... 348/350 |
| 4,577,095 A | * | 3/1986 | Watanabe ................. 250/201.2 |
| 5,134,468 A | * | 7/1992 | Ohmuro ..................... 348/337 |
| 6,219,468 B1 | * | 4/2001 | Yukawa et al. ............. 382/312 |
| 6,538,249 B1 | * | 3/2003 | Takane et al. .............. 250/310 |

FOREIGN PATENT DOCUMENTS

| | | |
|---|---|---|
| GB | 2047037 A | 11/1980 |
| JP | 57-119309 A | 7/1982 |
| JP | 62-247314 | 10/1987 |
| JP | 7-60211 | 6/1995 |

* cited by examiner

Primary Examiner—David L. Ometz
Assistant Examiner—Hung H. Lam
(74) Attorney, Agent, or Firm—Birch, Stewart, Kolasch & Birch, LLP

(57) ABSTRACT

The number of pixels of image pickup devices for detecting a focusing status is smaller than the number of pixels of an image pickup device for image-output, or an image pickup size of the image pickup devices for detecting the focusing status is smaller than the image pickup size of the image pickup device for image-output, so that the apparatus for detecting the focusing status that is inexpensive, consumes reduced power, and includes a circuit reduced in size is provided. Two image pickup devices for detecting the focusing status with different optical path lengths are provided with respect to an image pickup device for obtaining an image to be outputted, and subject light intended to be incident on the image pickup device is split to be incident on the image pickup devices for detecting the focusing status. Then, focusing evaluation values are obtained based on video signals from the image pickup devices for detecting the focusing status, and the focusing status is determined to be front focus, rear focus, or in focus based on the magnitudes of the focusing evaluation values. As the image pickup devices for detecting the focusing status, CCDs having less number of pixels and smaller image pickup size than the image pickup device for image-output is used.

10 Claims, 5 Drawing Sheets

F I G. 3
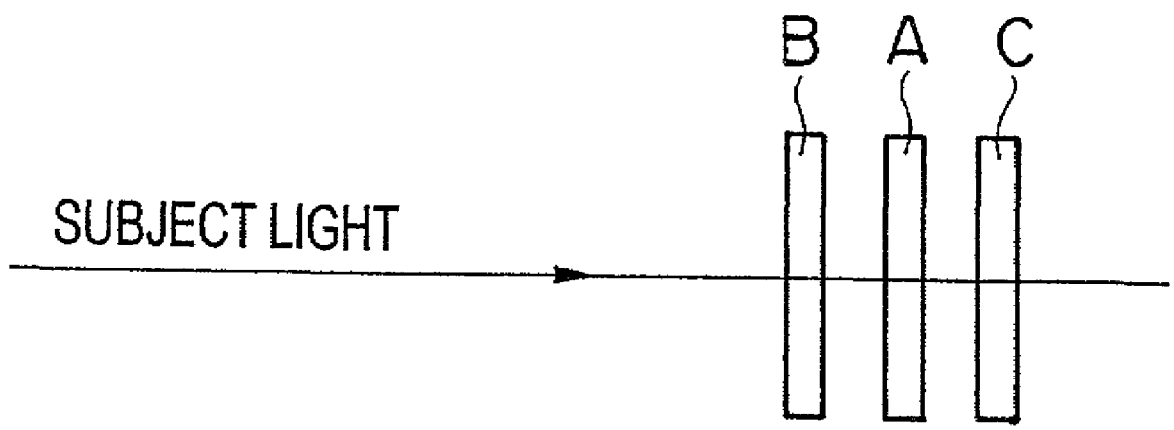

APPARATUS FOR DETECTING FOCUSING STATUS OF TAKING LENS

BACKGROUND OF THE INVENTION

1. Field of the Invention

The present invention relates to an apparatus for detecting a focusing status of a taking lens, more particularly, to an apparatus for detecting a focusing status of a taking lens that determines whether the focusing status of the taking lens is front focus, rear focus, or in focus.

2. Description of the Related Art

There has been proposed an apparatus for detecting a focusing status of a taking lens that uses a plurality of image pickup devices with different optical path lengths to detect the focusing status (front focus, rear focus, or in focus) of a television lens (U.S. Pat. No. 4,333,716, and Japanese Patent Publication No. 7-60211). For example, two image pickup devices for detecting a focusing status that are intended to obtain images in the same shooting range as that of an image pickup device for obtaining an image to be outputted (image pickup device for image-output) are disposed at two places where the optical path lengths are longer and shorter than that of the image pickup device for image-output, respectively. Then, a high frequency component is extracted from the image obtained by each of the image pickup devices for detecting the focusing status, and focusing evaluation values each representing a degree of focusing onto an image pickup surface of the image pickup device for detecting the focusing status (contrast of the image) are obtained based on the respective high frequency components and compared with each other. Thus, based on the relationship of magnitudes of the focusing evaluation values, the focusing status on the image pickup surface of the image pickup device for image-output, that is, front focus, rear focus, or in focus is determined. Such the apparatus for detecting the focusing status can be applied as a focusing detecting device for automatic focusing.

Recently, a camera for a high definition (HD) system has come into use so that the number of pixels of the image pickup device for image-output has been increased compared with the conventional NTSC system. For example, while the image pickup device used in the camera for the NTSC system involves 380 thousands (768×494) of pixels, the image pickup device used in the camera for the HD system involves two millions (1920×1082) of pixels. In the case where an apparatus for detecting a focusing status is applied in the HD system, it is desired that image pickup devices according to the HD specification, that is, image pickup devices with two millions of pixels are used as the image pickup devices for detecting the focusing status as well as the image pickup device for image-output. However, the image pickup device and a peripheral circuit thereof according to the HD specification are disadvantageous in that they are more expensive, consume higher power, and include a larger circuit compared with the conventional system such as the NTSC system.

SUMMARY OF THE INVENTION

The present invention is devised in view of such a circumstances, and an object of the present invention is to provide an apparatus for detecting a focusing status of a taking lens that is inexpensive, consumes reduced power, and includes a circuit reduced in size.

In order to attain the above-described object, the present invention is directed to a focusing status detecting apparatus which detects a focusing status of a taking lens with respect to an image pickup device for image-output of a camera that obtains an image to be outputted, the focusing status detecting apparatus determining that the focusing status is one of front focus, rear focus, and in focus, the focusing status detecting apparatus comprising: a plurality of image pickup devices for detecting the focusing status which detect the focusing status, the plurality of image pickup devices receiving subject light incident through the taking lens with different optical path lengths, a focusing evaluation value being obtained according to a high frequency component of each of images obtained by the plurality of image pickup devices for detecting the focusing status, the focusing status being determined according to the obtained focusing evaluation value, wherein a number of pixels of the plurality of image pickup devices for detecting the focusing status is smaller than a number of pixels of the image pickup device for image-output, and the focusing status is detected within a frame range smaller than the entire frame range of the image to be outputted obtained by the image pickup device for image-output.

The present invention is also directed to a focusing status detecting apparatus which detects a focusing status of a taking lens with respect to an image pickup device for image-output of a camera that obtains an image to be outputted, the focusing status detecting apparatus determining that the focusing status is one of front focus, rear focus, and in focus, the focusing status detecting apparatus comprising: a plurality of image pickup devices for detecting the focusing status which detect the focusing status, the plurality of image pickup devices receiving subject light incident through the taking lens with different optical path lengths, a focusing evaluation value being obtained according to a high frequency component of each of images obtained by the plurality of image pickup devices for detecting the focusing status, the focusing status being determined according to the obtained focusing evaluation value, wherein an image pickup size of the plurality of image pickup devices for detecting the focusing status is smaller than an image pickup size of the image pickup device for image-output, and the focusing status is detected within a frame range smaller than the entire frame range of the image to be outputted obtained by the image pickup device for image-output.

According to the present invention, the focusing status is detected within a frame range smaller than the entire frame range of the image to be outputted obtained by the image pickup device for image-output, and the number of pixels of the image pickup device for detecting the focusing status is smaller than the number of pixels of the image pickup device for image-output, or an image pickup size of the image pickup device for detecting the focusing status is smaller than the image pickup size of the image pickup device for image-output. Therefore, an apparatus for detecting the focusing status that is inexpensive, consumes reduced power, and includes a circuit reduced in size can be provided.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 shows a positional relationship among the image pickup devices A, B, and C in the case where the optical paths of the subject light incident on the image pickup devices A, B, and C are represented as extending along a same straight line;

DETAILED DESCRIPTION OF THE PREFERRED EMBODIMENTS

A preferred embodiment of an apparatus for detecting a focusing status of a taking lens according to the present invention will be described below with reference to the accompanying drawings.

Figure 1:
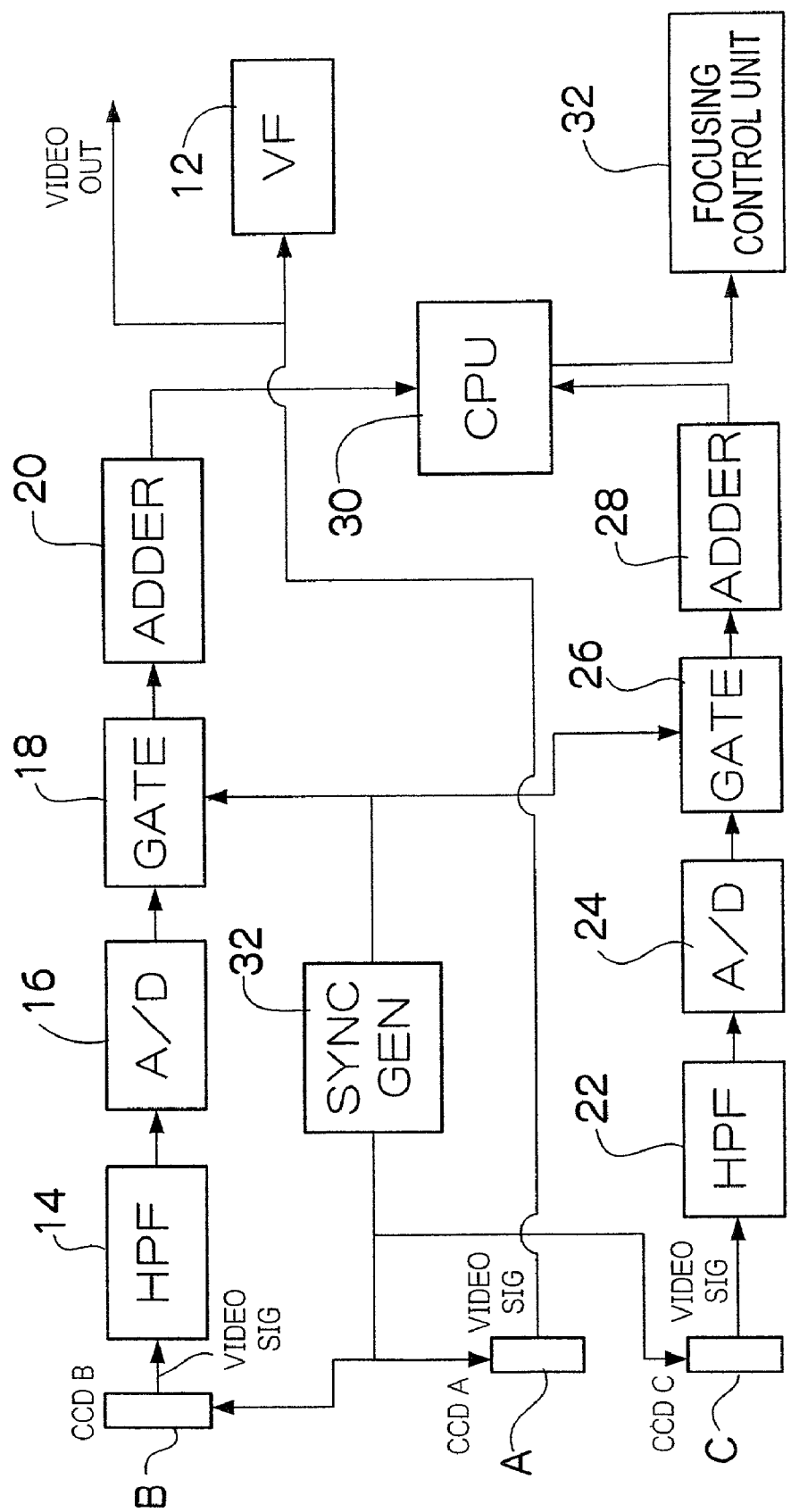
FIG. 1 shows a configuration of an apparatus for detecting a focusing status according to the present invention.

FIG. 1 shows a configuration of an apparatus for detecting a focusing status according to the present invention. For example, in addition to an image pickup device (CCD) A for image-output which is incorporated in a television camera and obtains an image to be outputted that is to be video-output from the camera to the outside (an image pickup device that is mounted on a typical camera), image pickup devices (CCD) B and C for detecting the focusing status are provided in the apparatus for detecting the focusing status. The image pickup devices A, B, and C are disposed separately so as to pick up subject light having passed through a taking lens, which is attached to the television camera and, not shown in the drawing, at places of different optical path lengths.

Figure 2:
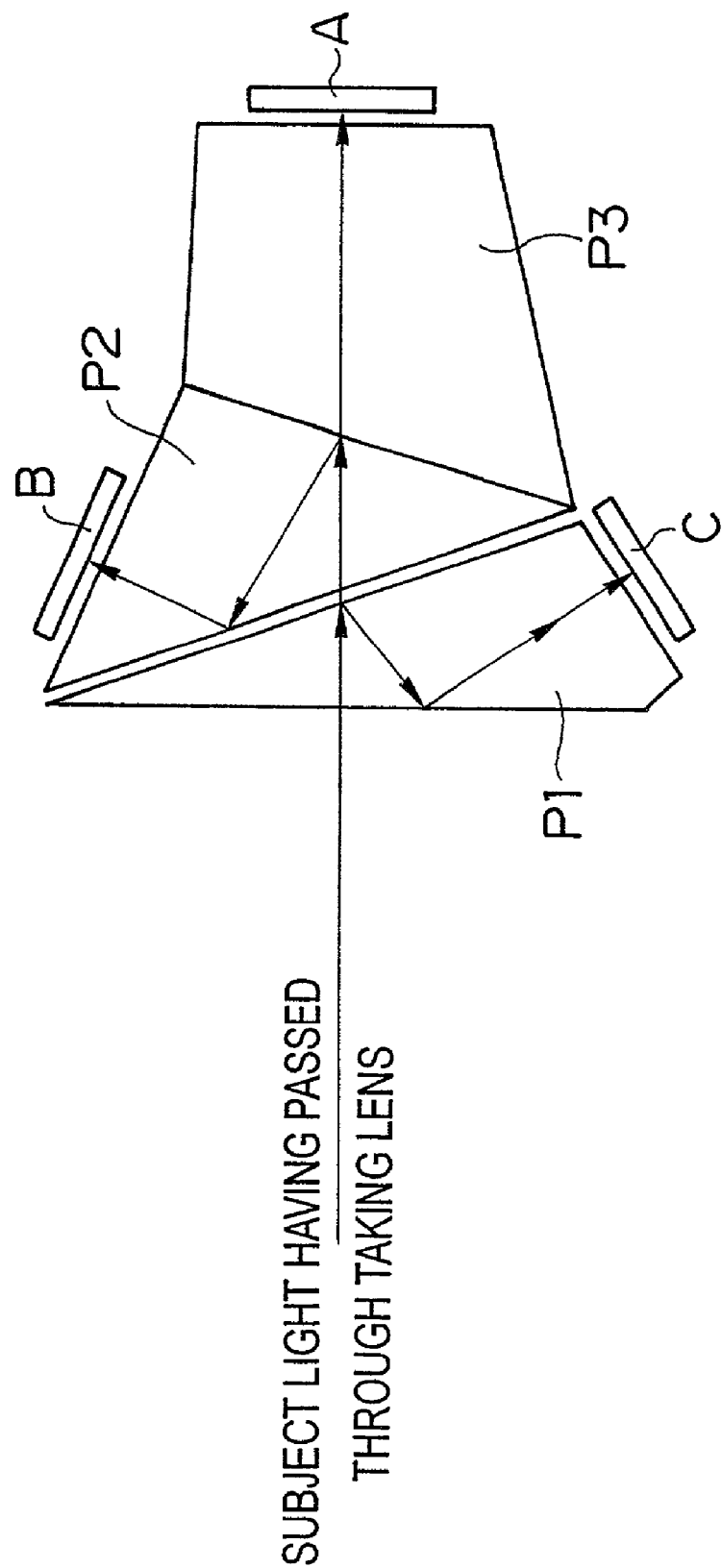
FIG. 2 shows one embodiment of a configuration of an optical system having an image pickup device for obtaining an image to be outputted A and image pickup devices B and C for detecting the focusing status disposed therein.

FIG. 2 shows a configuration of an optical system having the image pickup devices A, B, and C disposed therein. As shown in this drawing, the subject light having passed through the taking lens is split by a first prism P1. One of the split subject light that is reflected by the first prism P1 is incident on an image pickup surface of the image pickup device C. The other of the split subject light that has passed through the first prism P1 is then further split by a boundary surface between a second prism P2 and a third prism P3, and one of the subject light split by the boundary surface is incident on the image pickup device B. Consequently, the split subject light that has passed through the first prism P1, second prism P2, and third prism P3 is incident on the image pickup device A. In this regard, ratios between respective amounts of the split subject light incident on the image pickup devices B and C and an amount of the subject light that has passed through the taking lens and been incident on the first prism P1 are equal to each other. If the amounts of the subject light incident on the image pickup devices B and C are large, the amount of the subject light incident on the image pickup device A is small so that the image to be outputted originally required darkens. Therefore, it is preferable that the amounts of the subject light incident on the image pickup devices B and C are as small as possible compared with the amount of the subject light incident on the image pickup device A.

FIG. 3 shows a case where the optical paths of the subject light incident on the image pickup devices A, B, and C (optical axes of the image pickup devices) are represented as extending along a same straight line. In this drawing, the image pickup device B has the shortest optical path length, the image pickup device C has the longest optical path length, and the image pickup device A has the intermediate optical path length between the optical path lengths of the image pickup devices B and C. In other words, the image pickup devices B and C are arranged before and behind the image pickup device A in such a manner that the image pickup surfaces of the image pickup devices B and C are equally spaced apart from and parallel with the image pickup surface of the image pickup device A. The configuration of the optical system that distributes the subject light among the image pickup devices A, B, and C is not limited to that involving a prism as shown in FIG. 2.

Figure 4:
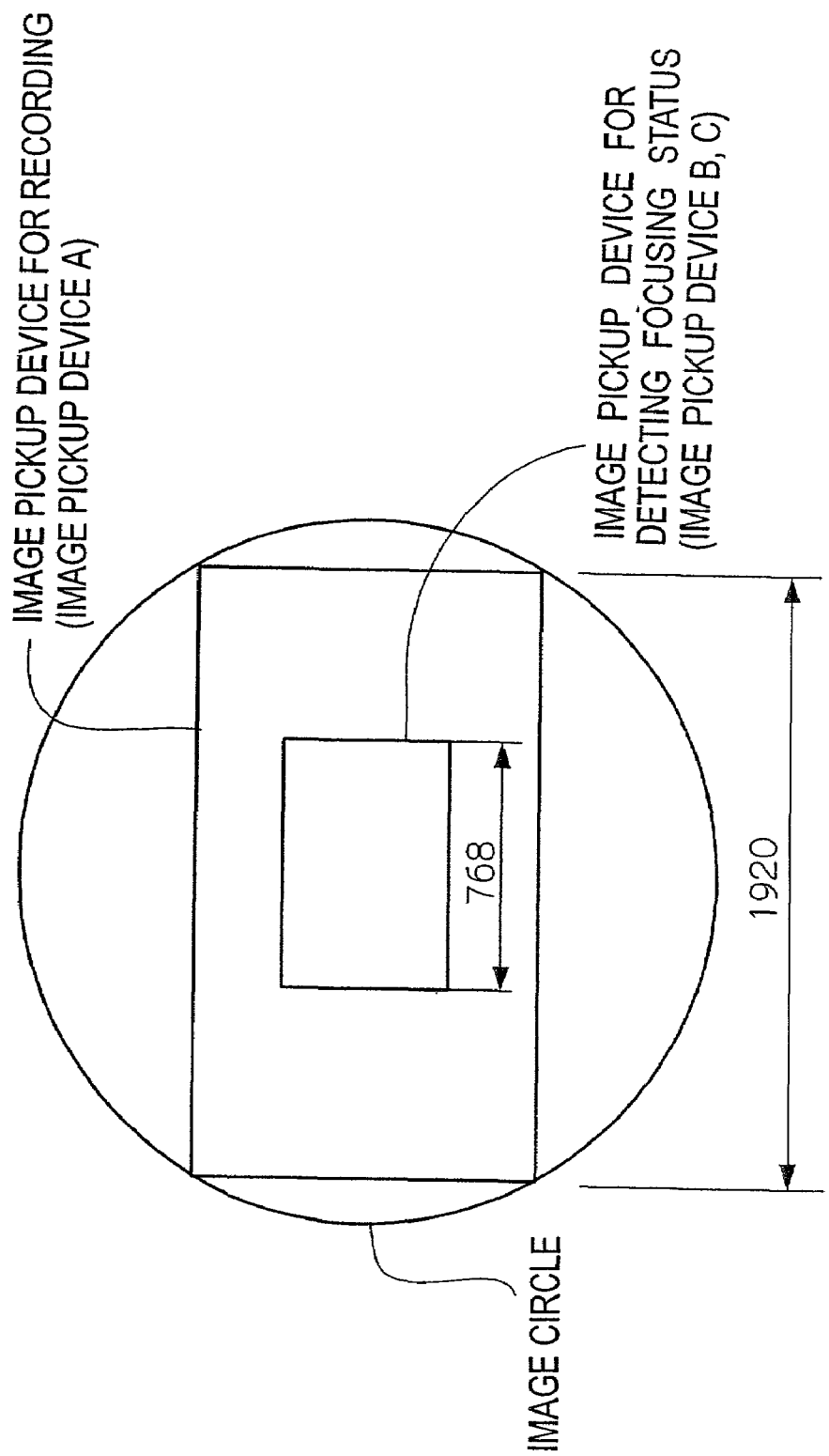
FIG. 4 shows the image pickup device A for image-output and the image pickup devices B and C for detecting the focusing status with their optical axes aligned with each other for comparison.

FIG. 4 shows the image pickup device A for image-output and the image pickup devices B and C for detecting the focusing status with their optical axes aligned with each other for comparison. As shown in this drawing, the image pickup device A and the image pickup devices B and C are different in the number of pixels and image pickup size (photo-receiving size). For example, considering the specification of the HD system camera, ⅔-inch CCD with approximately two millions (1920×1082) of pixels is used as the image pickup device A for image-output. On the other hand, as the image pickup devices B and C for detecting the focusing status, ⅓-inch CCD with approximately 380 thousands (768×494) of pixels used in the conventional NTSC system is used, for example.

A process for detecting the focusing status by the image pickup devices B and C for detecting the focusing status will be described later. Generally, the range of a frame intended to obtain focusing information using the image pickup devices B and C for detecting the focusing status can be smaller than the entire frame range of the image to be outputted obtained by the image pickup device A. Therefore, the image pickup devices B and C for detecting the focusing status are not required to cover the entire image pickup size of the image pickup device A for image-output (image circle of the HD system), and the compact devices used in the NTSC system described above can be used. For example, the image pickup devices B and C can provide focusing information with the same degree of resolution as the HD system within ½.5 of the range of the HD system in which pixels of the image pickup devices A, B, and C are the same in dimension in the horizontal direction.

As shown in FIG. 1, an image signal of a subject shot by the image pickup device A for image-output is converted into a video signal in a predetermined format by a camera circuit (not shown), and the video signal is video-output to the outside of the camera and is output to a viewfinder 12 for display.

On the other hand, each of image signals of a subject shot by the image pickup devices B and C for detecting the focusing status is converted into a video signal in a predetermined format by a signal processing circuit (not shown), and then converted into a signal of a focusing evaluation value representing a definition of the image (contrast of the image). The video signal obtained by the image pickup devices B and C is not necessarily in the same format as the video signal obtained by the image pickup device A. For example, it may be only a luminance signal, and an image pickup device for a monochrome image may be used as the image pickup devices B and C.

Now, a derivation circuit of a focusing evaluation value signal based on the video signal obtained by the image pickup device B will be described. First, the video signal obtained by the image pick up device B is input to a high-pass filter (HPF) 14, where a high frequency component of the video signal is extracted. The high frequency component signal extracted from the HPF 14 is converted into a digital signal by an A/D converted 16. Then, among the digital signals of the image for one frame (one field) that is obtained by the image pickup device B, only those corresponding to the pixels within a predetermined focus area (for example, center of the frame) are extracted by a gate circuit 18, and thereafter, the extracted digital signals are added together in an adder 20. In this way, the total sum of the values of the high frequency components of the video signals in the focus area can be obtained. The value obtained by the adder 20 is provided for a CPU 30 as the focusing evaluation signal representing the definition of the image in the focus area.

Similarly, based on the video signal obtained by the image pickup device C, the focusing evaluation value signal is generated by means of an HPF 22, A/D converter 24, gate circuit 26, and adder 28, and then provided for the CPU30. In addition, various synchronization signals is supplied to the image pickup devices A, B, and C, gate circuits 18 and 26, and the like from a synchronization signal generating circuit 32 in order to synchronize the processing in the respective circuits to each other. A vertical synchronization signal (V signal) for one field of the video signals is also supplied to the CPU30 from the synchronization signal generating circuit 32.

As shown in FIG. 4, since the image pickup areas of the image pickup devices B and C are restricted to the center of the frame of the image pickup area of the image pickup device A, the entire frame ranges of the image pickup devices B and C may be used as their respective focus areas. In such a case, the above-described gate circuits 18 and 26 may be omitted.

The CPU 30, based on the focusing evaluation value signals obtained by the image pickup devices B and C, determines which focusing status the taking lens is currently in, that is, in front focus, rear focus, or in focus. Then, if this apparatus for detecting the focusing status is used as means for detecting focusing in a automatic focusing mode, for example, the CPU 30, based on the detected focusing status, transmits an instruction signal to a focusing control unit 32 of the taking lens to make the focusing control unit 32 move the focusing lens so as to make the focus position coincide with the focal position.

Figure 5:
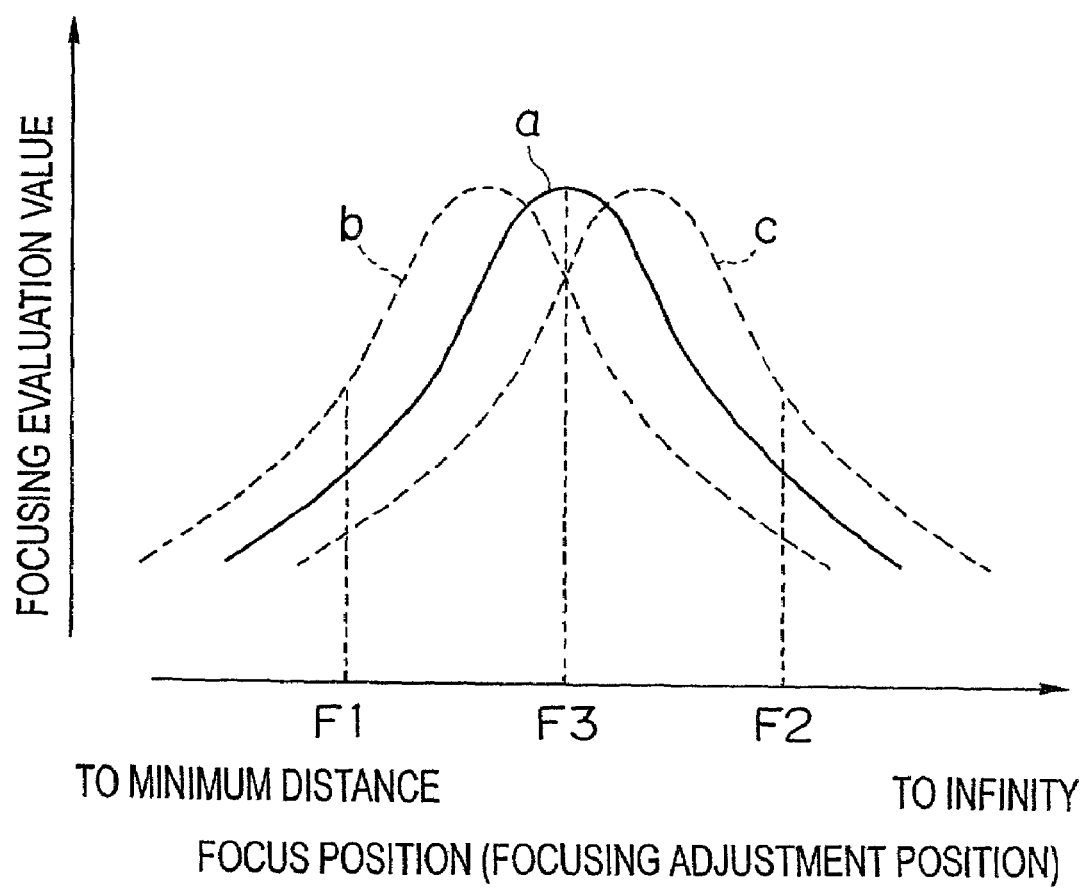
FIG. 5 shows a focusing evaluation value with respect to a focus position when a subject is shot.

The detection of the focusing status based on the focusing evaluation values obtained by the image pickup devices B and C is accomplished in the following manner, for example. FIG. 5 shows a focusing evaluation value for a focus position when a subject is shot, in which the horizontal axis represents a focus position of the taking lens, that is, a focusing adjustment position adjusted by a focus ring or the like, and the vertical axis represents the focusing evaluation value. A curve a represented by a solid line in this drawing represents the focusing evaluation value for the focus position of the taking lens in the case where the focusing evaluation value is obtained based on the video signal obtained by the image pickup device A. Curves b and c represented by dotted lines in this drawing represent the focusing evaluation value similarly obtained by the image pickup devices B and C, respectively.

In this drawing, a focus position F3 at which the curve a has the maximum focusing evaluation value is the focal position. Now, it is assumed that the focus position (focusing adjustment position) is set to a position F1 in this drawing. Then, since the focusing evaluation value obtained by the image pickup device B is a value on the curve b corresponding to the focus position F1, and the focusing evaluation value obtained by the image pickup device C is a value on the curve c corresponding to the focus position F1, it is apparent that the focusing evaluation value obtained by the image pickup device B is larger than the focusing evaluation value obtained by the image pickup device C. In other words, if a focus position of the taking lens is set toward the minimum distance with respect to the focus position F3 that is the focal position, the focusing evaluation value obtained by the image pickup device B is larger than the focusing evaluation value obtained by the image pickup device C, and in such a condition, the taking lens is in the front focus status.

On the other hand, it is assumed that the focus position is set to a position F2 in this drawing. Then, it is apparent that the focusing evaluation value obtained by the image pickup device C is larger than the focusing evaluation value obtained by the image pickup device B. In other words, if a focus position of the taking lens is set toward the infinity with respect to the focus position F3 that is the focal position, the focusing evaluation value obtained by the image pickup device C is larger than the focusing evaluation value obtained by the image pickup device B, and in such a condition, the taking lens is in the rear focus status.

If a focus position (focusing adjustment position) of the taking lens is set to the focal position F3 in this drawing, that is, the taking lens is in focus, it is understood that the focusing evaluation values obtained by the image pickup devices B and C are equal to each other.

As described above, the CPU 30 compares the focusing evaluation value obtained by the image pickup device B with the focusing evaluation value obtained by the image pickup device C, and determines that the taking lens is in the front focus status if the focusing evaluation value obtained by the image pickup device B is larger than the focusing evaluation value obtained by the image pickup device C. On the contrary, if the focusing evaluation value obtained by the image pickup device C is larger than the focusing evaluation value obtained by the image pickup device B, the taking lens is determined to be in the rear focus status. If the focusing evaluation values obtained by the image pickup devices B and C are equal to each other, the taking lens is determined to be in focus.

In the embodiment described above, the image pickup devices B and C for detecting the focusing status are additionally provided besides the image pickup device A for obtaining an image to be outputted. If it is provided that the image pickup device A also serves as the image pickup device for detecting the focusing status, however, only one additional image pickup device for detecting the focusing status may be sufficient. For example, with reference to FIG. 1, a case where the image pickup device C is not provided, and the focusing status is detected by means of the image pickup devices A and C will be described. First, a circuit that obtains the focusing evaluation value from the video signal obtained by the image pickup device A is provided, that is, a circuit constituted by components equivalent to the HPF 14, A/D converter 16, gate circuit 18, and adder 20 is provided so that the focusing evaluation value can be input to the CPU 30. Then, the focusing evaluation value obtained by the image pickup device A is compared with the focusing evaluation value obtained by the image pickup device B as described above, and if the focusing evaluation values are equal to each other, the taking lens is determined to be in focus. Strictly speaking, in such a situation, focusing is provided between the image pickup surfaces of the image pickup devices A and B. However, if the distance between the image pickup surfaces of the image pickup devices A and B is small, the image pickup surface of the image pickup device A can be considered to be within the depth of focus, and therefore the video signal obtained by the image pickup device A can be used for image-output without any problems. On the other hand, if the focusing evaluation value obtained by the image pickup device B is larger than the focusing evaluation value obtained by the image pickup device A, the focusing status is determined to be front focus, and on the contrary, if the focusing evaluation value obtained by the image pickup device A is larger than the focusing evaluation value obtained by the image pickup device B, the focusing status is determined to be rear focus.

Furthermore, in the embodiment described above, the image pickup surfaces of the image pickup devices B and C are optically arranged before and behind the image pickup surface of the image pickup device A so as to be equally spaced apart from and parallel with the image pickup surface of the image pickup device A. However, the image pickup surfaces of the image pickup devices B and C may not be located before and behind the image pickup surface of the image pickup device A, nor equally spaced apart from it, and the focusing status can be detected so long as they are located at positions of different optical path length. In addition, the number of the image pickup devices for detecting the focusing status is not limited to two, and a focus position that realizes focusing onto the image pickup surface of the image pickup device for image-output can be detected by using three or more image pickup devices with different optical path length to obtain the focusing evaluation value.

In addition, in the embodiment described above, it is assumed that a CCD with approximately two millions of pixels used in the HD system is used as the image pickup device A for image-output, and a CCD with approximately 380 thousands of pixels used in the conventional NTSC system is used as the image pickup devices B and C for detecting the focusing status. However, the present invention can be applied to a case where the image pickup device A for image-output is not one used in the HD system. That is, without being limited to the image pickup device used in the HD system, the present invention is advantageous so long as an image pickup device for detecting the focusing status having less pixels and smaller image pickup size compared with the image pickup device for image-output is used. Furthermore, the present invention is advantageous if any one of the requirements is satisfied, that is, the image pickup device for detecting the focusing status has pixels less than that of the image pickup device for image-output, or the image pickup device for detecting the focusing status has a image pickup size smaller than that of the image pickup device for image-output.

As an application of the embodiment described above, a CCD with further smaller image pickup size may be used as the image pickup device for detecting the focusing status (image pickup devices B, C) and made to have a resolution higher than that of the image pickup device for image-output (image pickup device A), thereby improving precision of the focusing information.

Alternatively, instead of using a CCD with an image pickup size different from that of the image pickup device for image-output (image pickup device A) is used as the image pickup device for detecting the focusing status (image pickup devices B, C), an image circle of the image pickup device for detecting the focusing status (image pickup devices B, C) can be optically modified.

As described above, with the apparatus for detecting the focusing status of the taking lens according to the present invention, since the focusing status is detected within the frame range smaller than the entire frame range of the image to be outputted obtained by the image pickup device for image-output, the number of the pixels of the image pickup device for detecting the focusing status is smaller than that of the image pickup device for image-output, or the image pickup size of the image pickup device for detecting the focusing status is smaller than that of the image pickup device for image-output, an apparatus for detecting the focusing status that is inexpensive, consumes reduced power, and includes a circuit reduced in size.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A focusing status detecting apparatus which detects a focusing status of a taking lens with respect to a two-dimensional image pickup device for image-output of a camera that obtains an image to be outputted, the focusing status detecting apparatus determining that the focusing status is one of front focus, rear focus, and in focus, the focusing status detecting apparatus comprising:
a plurality of two-dimensional image pickup devices for detecting the focusing status which detect the focusing status, the plurality of image pickup devices receiving subject light incident through the taking lens with different optical path lengths, a focusing evaluation value being obtained according to a high frequency component of each of images obtained by the plurality of image pickup devices for detecting the focusing status, the focusing status being determined according to the obtained focusing evaluation value,
wherein a number of pixels of the plurality of image pickup devices for detecting the focusing status is smaller than a number of pixels of the image pickup device for image-output, and wherein of the digital signals of the images obtained by the image pickup devices for detecting focusing status only digital signals corresponding to pixels within a predetermined focus area are extracted, so that the focusing status is detected within a frame of the image smaller than the entire frame of the image to be outputted obtained by the image pickup device for image-output.

2. The focusing status detecting apparatus of claim 1 wherein said image pickup devices for detecting focusing status detect a frame.

3. The focusing status detecting apparatus of claim 2 wherein said predetermined focus area comprises a central portion of said frame.

4. A focusing status detecting apparatus which detects a focusing status of a taking lens with respect to a two-dimensional image pickup device for image-output of a camera that obtains an image to be outputted, the focusing status detecting apparatus determining that the focusing status is one of front focus, rear focus, and in focus, the focusing status detecting apparatus comprising:
a plurality of two dimensional image pickup devices for detecting the focusing status which detect the focusing status, the plurality of image pickup devices receiving subject light incident through the taking lens with different optical path lengths, a focusing evaluation value being obtained according to a high frequency component of each of images obtained by the plurality of image pickup devices for detecting the focusing status, the focusing status being determined according to the obtained focusing evaluation value, wherein an image pickup size of the plurality of image pickup devices for detecting the focusing status is smaller than an image pickup size of the image pickup device for image-output, and wherein of the digital signals of the images obtained by the image pickup devices for detecting focusing status only digital signals corresponding to pixels within a predetermined focus area are extracted, so that the focusing status is detected within a frame of the image smaller than the entire frame of the image to be outputted obtained by the image pickup device for image-output.

5. The focusing status detecting apparatus of claim 4 wherein said image pickup devices for detecting focusing status detect a frame.

6. The focusing status detecting apparatus of claim 5 wherein said predetermined focus area comprises a central portion of said frame.

7. A focusing status detecting apparatus which detects a focusing status of a taking lens with respect to a first image pickup device for image-output of a camera that obtains an image to be outputted, the focusing status detecting apparatus adapted to determine whether the focusing status is front focus, rear focus, or in focus, the focusing status detecting apparatus comprising:

a plurality of second image pickup devices for detecting the focusing status by detecting a two-dimensional image, the plurality of second image pickup devices receiving light incident through the taking lens with different optical path lengths, a focusing evaluation value being obtained according to a high frequency component of each of images obtained by the plurality of first image pickup devices, the focusing status being determined according to the obtained focusing evaluation value, wherein a number of pixels of the plurality of second image pickup devices is smaller than a number of pixels of the first image pickup device, and the focusing status is detected within a frame of the image smaller than the entire frame of the image to be outputted obtained by the first image pickup device.

8. The focusing status detecting apparatus of claim 7 wherein focusing status is detected using digital signals from fewer than all pixels of the plurality of second image pickup devices.

9. The focusing status detecting apparatus of claim 7 wherein focusing status is detected using digital signals from pixels in a predetermined focus area of the plurality of second image pickup devices.

10. The focusing status detecting apparatus of claim 9 wherein said predetermined focus area comprises a central area of a frame.

* * * * *